(12) United States Patent
Zhang (10) Patent No.: US 9,613,024 B1
(45) Date of Patent: Apr. 4, 2017

(54) SYSTEM AND METHODS FOR CREATING DATASETS REPRESENTING WORDS AND OBJECTS

(71) Applicant: Guangsheng Zhang, Palo Alto, CA (US)

(72) Inventor: Guangsheng Zhang, Palo Alto, CA (US)

( * ) Notice: Subject to any disclaimer, the term of this patent is extended or adjusted under 35 U.S.C. 154(b) by 0 days.

(21) Appl. No.: 14/935,404

(22) Filed: Nov. 7, 2015

Related U.S. Application Data (63) Continuation of application No. 13/763,716, filed on Feb. 10, 2013, now Pat. No. 9,183,274, which is a continuation of application No. 12/631,829, filed on Dec. 5, 2009, now Pat. No. 8,380,489.

(60) Provisional application No. 61/151,729, filed on Feb. 11, 2009.

(51) Int. Cl.
*G06F 17/27* (2006.01)

(52) U.S. Cl.
CPC ........ *G06F 17/2785* (2013.01); *G06F 17/274* (2013.01); *G06F 17/2705* (2013.01); *G06F 17/277* (2013.01)

(58) Field of Classification Search
USPC ........................................ 704/1–10
See application file for complete search history.

(56) References Cited

U.S. PATENT DOCUMENTS

| | | | | |
|---|---|---|---|---|
| 5,128,865 | A | * | 7/1992 | Sadler ................ G06F 17/271 704/2 |
| 5,237,503 | A | * | 8/1993 | Bedecarrax ......... G06F 17/2795 704/10 |
| 5,930,788 | A | | 7/1999 | Wical |
| 6,101,515 | A | | 8/2000 | Wical |
| 6,473,753 | B1 | | 10/2002 | Katariya |
| 6,487,545 | B1 | | 11/2002 | Wical |
| 8,380,489 | B1 | * | 2/2013 | Zhang ............... G06F 17/2785 704/4 |
| 9,183,274 | B1 | * | 11/2015 | Zhang ............... G06F 17/2785 |
| 2007/0255553 | A1 | | 11/2007 | Nomoto |
| 2008/0275694 | A1 | * | 11/2008 | Varone .............. G06F 17/2785 704/9 |

* cited by examiner

*Primary Examiner* — Abul Azad (57) ABSTRACT

Systems and methods are presented for producing datasets as symbolic or associative representations of terms or objects or entities. A term can be a word or a phrase, which can also be the name of an object or a topic or concept. A dataset is produced for a specific term or object. The dataset contains a plurality of other terms or values associated with the specific term, and can serve as a representation of the specific term by other terms or values obtained using machine-based algorithms from text contents. Terms or values in the datasets also represent information about an object, or information about properties associated with the object. Methods for obtaining the datasets include discovering the relationships between terms in a plurality of text contents, based on occurrence, location, and attributes associated with the terms in the text contents.

20 Claims, 7 Drawing Sheets

Object name: Computer

| Property Names | Object-dependent Association Strength |
|---|---|
| CPU | 0.99 |
| motherboard | 0.90 |
| memory | 0.95 |
| hard disk | 0.80 |
| operating system | 0.98 |
| speed | 0.60 |
| multi-media | 0.50 |
| case | 0.2 |
| software | 0.7 |
| color | 0.3 |
| UNIX | 0.5 |
| Microsoft | 0.8 |
| …… | …… |

| Property Names | Object-dependent Association Strength | Internal Association Strength | External Association Strength |
|---|---|---|---|
| CPU | 0.99 | 0.99 | 0.0 |
| Motherboard | 0.90 | 0.90 | 0.0 |
| Memory | 0.95 | 0.96 | 0.01 |
| Hard disk | 0.80 | 0.81 | 0.01 |
| Operating system | 0.98 | 0.99 | 0.01 |
| Speed | 0.60 | 0.70 | 0.10 |
| Multimedia | 0.5 | 0.65 | 0.015 |
| Case | 0.2 | 0.22 | 0.02 |
| Software | 0.7 | 0.71 | 0.01 |
| Color | 0.3 | 0.35 | 0.05 |
| Unix | 0.5 | 0.51 | 0.01 |
| Microsoft | 0.8 | 0.85 | 0.05 |
| …… | …… | …… | …… |
|  |  |  |  |
|  |  |  |  |

SYSTEM AND METHODS FOR CREATING DATASETS REPRESENTING WORDS AND OBJECTS

CROSS REFERENCES TO RELATED APPLICATIONS

The present application is a Continuation Application of and claims priority to U.S. patent application Ser. No. 13/763,716, entitled "System, Methods, and Data Structure for Representing Object and Properties Associations" filed by the present inventor on Feb. 10, 2013. U.S. patent application Ser. No. 13/763,716 is a Continuation Application of and claims priority to U.S. patent application Ser. No. 12/631,829, entitled "System, Methods, and Data Jo Structure for Quantitative Assessment of Symbolic Associations in Natural Language" filed by the present inventor on Dec. 5, 2009. U.S. patent application Ser. No. 12/631,829 further claims priority to U.S. Provisional Patent Application 61/151,729, titled "Article of manufacture and methods for the production of object-properties symbolic association knowledge module data packages and methods of use", filed by the present inventor on Feb. 11, 2009, the disclosures of which are incorporated herein by reference.

BACKGROUND

The present application relates to information management, and more particularly, to technologies for information identification and quantification in natural language contents, and classification, ranking, searching, and retrieval of such contents.

In the information age, more and more individuals and organizations are faced with the problem of information overload. Accurate and efficient methods for information access, including collection, storage, organization, search and retrieval are the key to the success in this information age.

Much of the information is contained in natural language contents, such as text documents. Various theoretical and practical attempts have been made to efficiently organize and determine the amount and relevancy of the information in natural language contents. The existing techniques, including various search engines and document classification systems, however, are often not sufficiently accurate in identifying the information focus in the content, thus often cannot effectively serve the information needs of their users. There is still a need for accurate, efficient, and automated technologies to search, rank, and classify large amounts of natural language contents based on the meaning of the contents, and the amount of information they contain.

SUMMARY

In a general aspect, the present invention relates to a method for quantitatively assessing associations between different terms in a natural language. The method includes obtaining, by a computer system, a first group of sentences, at least some of which comprise an object name; parsing each of the first group of sentences to identify a subject and a Jo predicate by the computer system; assigning a sentence type to each of the first group of sentences according to the location of the object name in the sentence; tokenizing each of the first group of sentences to produce a plurality of tokens that includes a jth token; for each sentence in the first group of sentences that includes the jth token, adding a weighting coefficient to a parameter token_j_count, wherein the weighting coefficient is dependent on the sentence type of the corresponding sentence, wherein token_j_count represents the likelihood of the jth token to be a property name associated with the object name; and dividing a cumulative value of the parameter token_j_count obtained from the first group of sentences by the total number of sentences in the first group to produce an internal association strength (IAS) for the jth token, wherein one or more property names are to be selected from the plurality of tokens using their respective internal association strengths.

Implementations of the disclosed systems and methods may include one or more of the following. The sentence type can include a first sentence type defining a sentence in which the object name matches the subject, a second sentence type defining a sentence in which the subject is a multi-word phrase and the object name is the head of the multi-word phrase, a third sentence type defining a sentence in which the subject is a multi-word phrase and the object name is a modifier in the multi-word phrase, or a fourth sentence type defining a sentence in which the object name matches the predicate of the sentence. The sentence type can include a fifth sentence type defining a sentence in which the predicate contains a sub-phrase that contains the object name and in which the object name is the head of the sub-phrase, a sixth sentence type defining a sentence in which the predicate contains a multi-word phrase and the object name is a modifier in the multi-word phrase, a seventh sentence type defining a sentence in which the object name is in any other text in the sentence, or an eighth sentence type defining a sentence in which the sentence does not contain the object name. The weighting coefficients respectively assigned to the first sentence type to the eighth sentence type can have decreasing values as assessment of the likelihood that a token in a sentence is a property name of the object. The method can further include selecting a list of property names from the tokens that have their respective internal association strength values satisfying a predetermined criterion. The method can further include receiving, by the computer system, a second group of sentences that do not comprise the object name; tokenizing the second group of sentences to produce a plurality of tokens comprising the jth token; counting, in the second group of sentences, the number of sentences that each includes the jth token; calculating an external association strength (EAS) for the jth token by dividing the number of sentences that each includes the jth token by the total number of sentences in the second group; and calculating an object-dependent association strength (ODAS) between the jth token and the object name using the internal association strength and the external association strength for the jth token, wherein the object-dependent association strength describes the degree of association between the jth token and the object name. The ODAS value can be equal to the IAS value subtracted by the EAS value. The ODAS value can be the square of IAS value divided by the sum of the IAS value and the EAS value. The method can further include selecting a list of property names from the tokens that have their respective object-dependent association strength values satisfying a predetermined criterion.

In another general aspect, the present invention relates to a method for quantitatively assessing associations between different terms in a natural language. The method includes obtaining a first group of text units by a computer system, wherein the text unit is a paragraph or a document each comprising an object name; assigning a text unit type to each of the first group of text units; assigning a weighting coefficient to each of the first group of text units according to its associated text unit type; tokenizing each of the first group of text units by the computer system to produce a plurality of tokens that include a jth token; for each text unit in the first group of text units that includes the token_j, adding a weighting coefficient to a parameter token_j_count; dividing a cumulative value of the parameter token_j_count obtained from the first group of text units by the total number of text units in the first group of text units to produce an internal association strength for the jth token; receiving a second group of text units that do not include the object name; tokenizing the second group of text units to produce a plurality of tokens comprising the jth token; counting, in the second group of text units, the number of text units that each includes the jth token; calculating an external association strength for the jth token by dividing the number of text units that each includes the jth token by the total number of text units in the second group of text units; and calculating an object-dependent association strength (ODAS) between the jth token and the object name using the internal association strength and the external association strength for the jth token. The ODAS can describe the degree of association between the jth token and the object name. One or more tokens can be selected as property names from the plurality of tokens using their respective ODAS values.

Implementations of the disclosed systems and methods may include one or more of the following. The object name can be in a sentence comprising a subject and a predicate in each of the first group of text units. The text unit type of each of the first group of text units can be assigned according to whether the object name is in the subject or the predicate of a sentence in the text unit, the total number of sentences in the text unit that include the object name in the subject, the total number of sentences in the text unit that include the object name in the predicate, or the total number of the object name in the text unit.

In yet another general aspect, the present invention relates to a system for quantitatively representing association between a property name and an object name in a natural language. The system includes a computer storage device configured to store a data structure that can include: a first data field for an object name; a second data field configured to store a property name associated with the object name; a third data field configured to store value for an internal association strength for the property name, wherein IAS represents a degree of closeness of the property name to the object name; and a fourth data field configured to store value for an external association strength for the property name, wherein EAS represents a degree that the property name is not associated with the object name. The system also includes a computer processor in communication with the computer storage, the computer processor being configured to quantitatively assess information related to the object name in a plurality of documents based on the values stored in the data structure in the computer storage device.

Implementations of the disclosed systems and methods may include one or more of the following. The data structure can further include a fifth data field configured to store a value for an object-dependent association strength (ODAS) for the property name, wherein the value for the ODAS is computed from the IAS value and the EAS value.

In still another general aspect, the present invention relates to a system for intelligent information assessment in documents. The system includes a first module configured to receive a plurality of documents; a second module configured to receive an object name that defines the information to be retrieved in the plurality of documents; a knowledge module that can include a plurality of property names related to the object name, an internal association strength for each of the property names, wherein IAS represents a degree of closeness of the property name to the object name, and an external association strength for each of the property names, wherein EAS represents a degree the property name is not related to the object name; and a third module configured to select a subset of the plurality of property names based on a first criterion for IAS and a second criterion for EAS, wherein the first module is configured to quantitatively assess information in the plurality of documents using the selected property names.

Implementations of the disclosed systems and methods may include one or more of the following. The information can be quantitatively assessed in the plurality of documents based on a first performance measure and a second performance measure, wherein the first criterion and the second criterion are adjusted according to requirements on the first performance measure and the second performance measure. The first performance measure can be recall. The second performance measure can be precision.

The present disclosure provides a linguistic-informational framework and implementation methods for creating data packages that store the knowledge about symbolic associations between an object and its potential properties with quantitative characterization of the strength of such associations. The present disclosure provides methods for identifying potential properties of an object from linguistic contents that contain information about the object and its properties, and methods for quantitatively characterizing the strength of the associations between each of such properties with the specific object. The present disclosure provides data structures with novel data content representing such knowledge about the associations between an object and its properties.

One significant advantage of the present disclosure is that the disclosed systems and methods can be used to build up a comprehensive but highly scalable and customizable knowledge system about any topic or concept of interest, which can further be used by various intelligent systems, including natural language understanding, search engines, document classification systems, and other information management systems, and decision-making systems to perform tasks that require knowledge about the world, and to improve the m quality and efficiency of such systems.

Another advantage of the present disclosure is that the disclosed systems and methods can greatly increase the machine-learning accuracy in quantifying associations among symbols or terms in a language as compared to some conventional methods.

Another advantage of the present disclosure is that the disclosed systems and methods can significantly reduce both the computational and human labor cost in acquiring associative knowledge about the objects in the world by employing novel linguistic and informational analysis techniques.

The disclosed system and methods can significantly improve the accuracy and relevancy ranking for information searching and retrieval. The disclosed system and methods can significantly improve the accuracy for document classification. The disclosed system and methods can provide contextual information for sense disambiguation in natural language understanding, machine translation, and speech recognition.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION

Human knowledge, or aspects of human knowledge, can be represented in various ways. While internal knowledge representations are functions of human brains, external or artificial representations such as Frame Representation and Semantic Networks are simulation models for certain aspects of such internal knowledge.

The present invention is based on a novel model developed by the present inventor for knowledge and linguistic information representation. The model, called Object Properties Association Model (OPAM), states that part of human knowledge is based on concepts about objects and their associated properties, or based on relationships between different objects. Certain objects are perceived as the properties of other objects. Certain objects are associated with other objects in ways that uniquely define the concepts of such other objects. Simply put, OPAM contends that an object can be uniquely defined by all its associated properties each of which carries a varying amount of information about the object.

Figure 1:
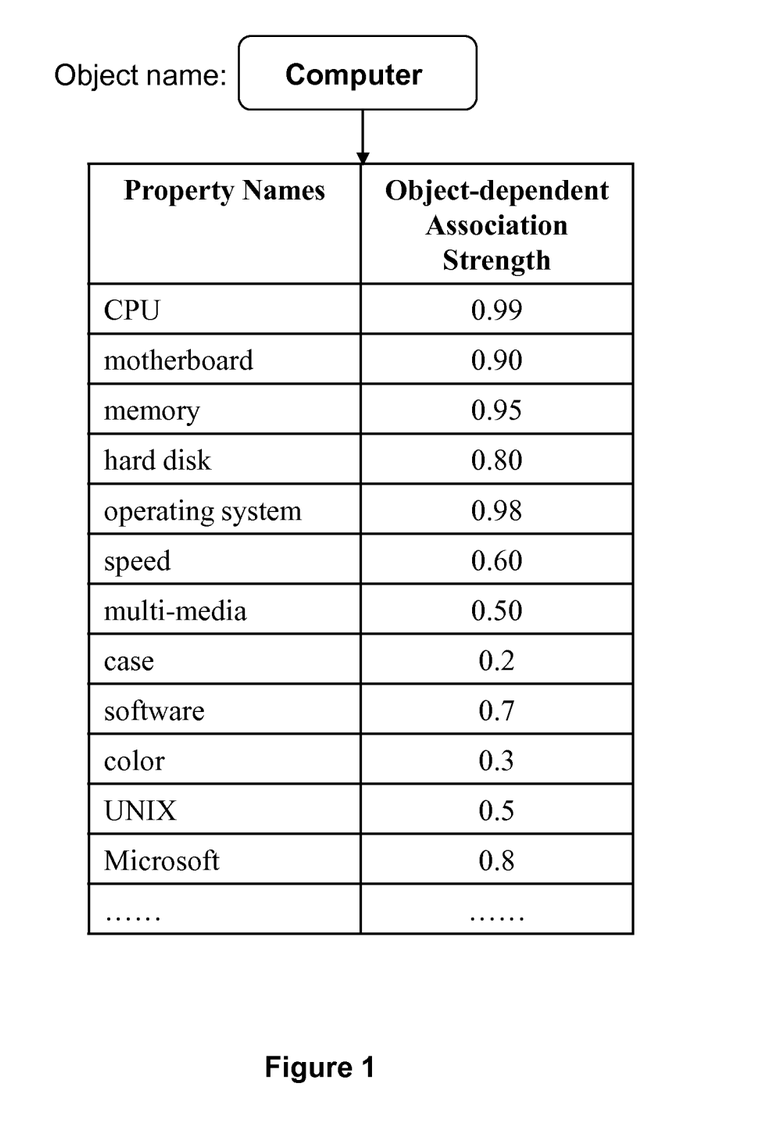
FIG. 1 illustrates an example of the object "computer", its defining properties and their association strengths associated with the object.

As an example, an object named "computer" is defined by the Merriam-Webster online dictionary as "one that computes; specifically: a programmable usually electronic device that can store, retrieve, and process data". However, the OPAM model of the present disclosure has a different approach to represent our knowledge about the object of "computer". Referring to FIG. 1, in the OPAM model, the object named "computer" is characterized by a plurality of associated properties such as "CPU", "motherboard", "memory", "hard disk", "operating system", "speed", "case", "software", etc., that are associated with the object "computer". The prominence of the association between "computer" and each of the properties is characterized by a numerical value herein called association strength. Hypothetical values for the association strengths for "CPU", "motherboard", "memory", "hard disk", "operating system", can for example respectively be 0.99, 0.90, 0.95, 0.80, and 0.98. A higher association strength value can represent a stronger association between the property and the object. The object "computer" can be uniquely defined by the associated properties and their respective association-strength values. Moreover, the association-strength value for a property is specific to the object, and usually varies for different objects. For example, the property "color" may have an association-strength value of 0.8 if the object is "flower", but an association-strength value of 0.2 if the object is "computer".

Conventional knowledge representation models such as the Frame Representation and Semantic Networks focus on the types of relationships between different objects and their derived relationships, such as a tree-like structure of parent-children relationships among different objects. OPAM model of the present invention, in contrast, focuses on what properties are associated with a particular object and their association strength or defining power to the object. OPAM is not focused on the exact types of relationships between the properties and the object.

In OPAM, the object can be a physical object, or an abstract object such as a concept, and can be represented by a symbolic name in a language such as a word, a list of words or a phrase, a character string, a query, a sub-component of a query, a topic, or the name of a document category.

As the present disclosure involves natural languages, and makes references to certain grammatical terms such as a "sentence", and the "subject" and "predicate" of a sentence, it should be noted that the term "object" used in the present disclosure is different from the grammatical term of "object" that refers to the object of a transitive verb, such as a noun or a pronoun, which may be in the accusative case in certain languages. In the present disclosure, this sense of "object" is not used. The sense of "object" used in the present disclosure is a thing or a concept with a name.

Properties of an object can have varying degrees of prominence or association strengths to the object. While the properties are "defining features" of an object, the association strengths in OPAM specify that some properties are more "defining" than others. For example, the object of "computer" is associated with various properties such as having a CPU, memory, a case, a hard disk, as shown in FIG. 1. The property "CPU" having an association-strength of 0.99 is a more defining feature of the object "computer" than the property "case" that has an association-strength value of 0.2.

The OPAM also states that such object-properties relationships are contained in our everyday language. Corresponding to the grammatical structure, there is an information structure in the language we use. Take a simple declarative sentence for example. A simple declarative sentence consists of two parts, the subject and the predicate. In linguistics, a common understanding is that the subject is what the sentence is about, and the predicate tells something about the subject. In the following simple sentences:

1A "John is a student."
1B "John is intelligent."

"John" is the subject of the sentences, while "is a student" and "is intelligent" are respectively the predicates of 1A and 1B.

In the OPAM model, the predicate is interpreted as providing a piece of measurable information about the subject of the sentence. The OPAM model also states that human languages convey information in the basic form of stating that an object has certain properties, or an object is associated with certain other objects as being its properties. The general information structure for a simple declarative sentence is "Object O has or is associated with Property P", or O+P, corresponding to the grammatical structure of "Subject+Predicate", where the Subject is the name of an object, and the Predicate is a declaration that the object has (or is associated with) one or more properties. In the present disclosure, the use of "simple sentence" and "simple declarative sentence" is interchangeable.

The simple sentence 1A is a statement about two objects of "John" and "student". In a conventional understanding, the speaker is telling something about John (that he is a student). In a mathematical or logical interpretation, the object "John" is declared to be a member of the object class of students. In the presently disclosed OPAM, the object "John" is said to have or to be associated with a property of "being a student". The speaker is providing a piece of information about the object of "John". The simple sentence 1B associates another property with the object of "John" (that he is intelligent), thus providing another piece of information about the object of "John".

The same information structure in the simple sentences can also hold in complex sentences, as well as the grammatically distinguished compound sentences. A complex sentence is a sentence that contains other (embedded) sentences or clauses as its components. For example, in the complex sentence "I know that you are intelligent", the predicate "know that you are intelligent" contains another sentence of "you are intelligent", which has its own subject ("you" in this case) and predicate ("are intelligent"). Complex sentences, and simple sentences contained in them, can be recursively reduced to the atomic Subject+Predicate structure, corresponding to the basic information structure of Object+Property.

In conventional grammar, a compound sentence is a sentence that contains two or more independent clauses, or non-embedded clauses, such as "John is a student, and Mary is a teacher." in which the two clauses do not contain each other. For convenience, in the present disclosure, the term "complex sentence" refers to both the complex sentence and the compound sentence.

The subject or the predicate of a sentence can be in the form of a single word, a string of words or a phrase, or an embedded clause.

In linguistics, a phrase that consists of multiple words is often called a complex phrase, with an internal structure of "Modifiers+Head". For example, in the phrase "digital cameras", "digital" is the modifier, while "cameras" is the head. The order of the head vs. the modifiers in the phrase depends on the specific languages. In English, the head of a noun phrase may either be before or after the modifier. For example, in the phrase "the observed facts" and "the facts observed", the head noun of "facts" can be before or after the modifier. Under the OPAM model of the present invention, the informational structure of a complex phrase can also be represented by Object+Property, corresponding to the grammatical structure of the Head+Modifier. For example, in the phrase "digital camera", "digital" is interpreted as a property of the object of camera.

A document can include one or more paragraphs. Each paragraph can include one or more simple and/or complex sentences.

Given the information structure of a simple sentence as being "Object O is associated with Property P", the amount of information a linguistic content may carry also depends on which properties of the object is being associated with the object. Compare the following:

2A. "A computer has a CPU."
2B. "A computer has a case."

Sentences 2A and 2B may not convey new information about the object of computer to someone having basic knowledge about computers. When asked: "Which of the sentences is more informative about the object of computer?" however, the same person would very likely choose 2A as the more informative one. This example shows that for the same object and to the same receiver of a message, different properties carry different amounts of information about the object. In this example, "CPU" is a more defining feature than "case" for the object "computer".

The sentence "A computer has a CPU and a hard disk." contains more information about the object "computer" than the sentence 2A. A document consists of two sentences such as "A computer has a CPU. And it also has a hard disk." contains more information about the object of "computer" than a document that consists of only one single sentence such as "A computer has a CPU." In OPAM of the present disclosure, this is stated as the cumulative or incremental nature of the amount of information in a linguistic content.

Figure 2:
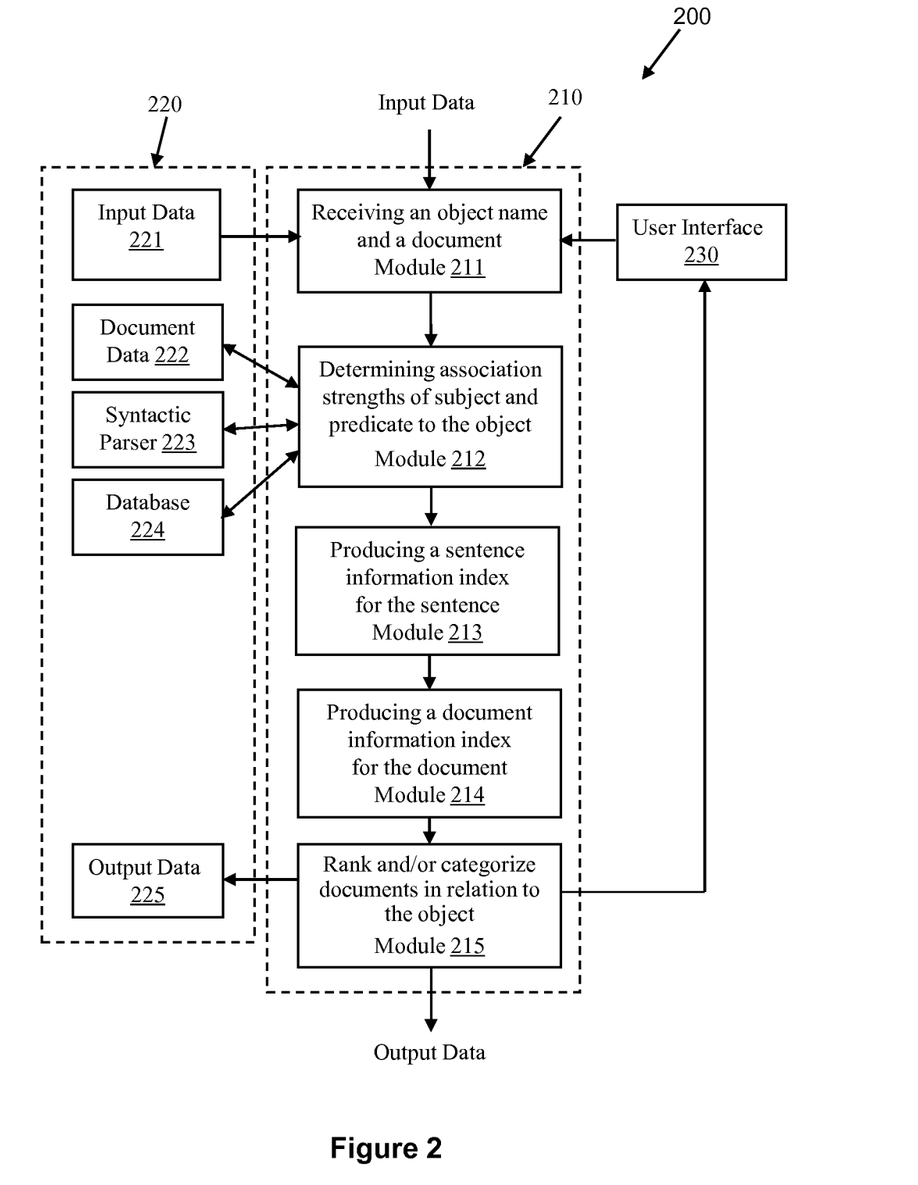
FIG. 2 is an exemplified system block diagram for quantitatively assessing information in natural language content in accordance with the present invention.

Referring to FIG. 2, a system 200 for quantitatively assessing information in natural language contents includes a computer processing system 210, a computer storage system 220, and a user interface 230. The computer processing system 210 includes algorithmic applications that further include functional modules 211-215 for conducting quantitative assessment of information in natural language contents. The computer processing system 210 can be implemented as, but not limited to, a central processing unit, an application-specific computer processor, a network server, and a group of computer processors. The computer processing system 210 can be implemented on a device that has computation power, for example, a personal computer, a portable computer, a mobile device such as a smart phone or a personal digital assistant, a computer network system comprising servers and processors that can provide information service to a remote server or client machine, and a cloud computing system. The computer storage system 220 can store, as described in more detail below, input data 221, document data 222 comprising one or more documents, optionally a syntactic parser 223, a database 224, and output data 225. The computer storage system 220 can be implemented in many types of storage media based on magnetic, optical, and mechanical properties, and nano materials, which can include a hard drive and an array of hard drives, flash memory, optical disks, and magnetic tapes. The user interface 230 can be provided, for example, by a program installed on a computer, a web browser, and an application for mobile devices.

The module 211 in the computer processing system 210 receives input data from an external source, input data 221 in the computer storage system 220, or the user interface 230. The input source can include a query from a web browser, a search text string entered by a user at a user interface (e.g. 230). The input data includes an object name and a document. The object name can be in the form of a word, a list of words or a phrase, a character string, a sub-component of such string. The object can be a physical object or an abstract object. The object name can be obtained from the input string, which can be or can contain a query, a topic, or the name of a document category. The document can be any type of documents that include text in a language, such as a web page, a menu, a book, an email, a text message, an article, a dictionary, an instruction manual, etc. The module 211 can first receive a path to one or more documents, and subsequently retrieves the one or more documents according to the path. The document(s) can be stored in document data 222 in the computer storage system 220.

The computer storage system 220 can optionally include a syntactic parser 223. A syntactic parser is in most cases a rule-based procedure, mostly embodied in the form of a computer program. It receives a string of characters, such as a sentence or an equivalent, and outputs a structural description of the grammatical relations between various components of the sentence. Syntactic parsers of various types can be freely or commercially available, or can be constructed based on rules one wishes to employ. The syntactic parser 223 can be used to divide a complex sentence into simple sentences, and then divide a simple sentence into a subject and a predicate. It can further divide a multi-word complex phrase into its components such as a head and its modifiers. As it is known, a syntactic parser may not always produce a structural description of a sentence that conforms to the understanding by human language users.

Details about systems and methods for quantitatively assessing information in natural language content is disclosed in commonly assigned U.S. patent application Ser. No. 12/573,134, titled "System and Methods for Quantitative Assessment of Information in Natural Language Contents", filed on Oct. 4, 2009, and Provisional Patent Application 61/143,140, titled "System and Methods for Quantitative Assessment of Information in Natural Language Contents" filed on Jan. 7, 2009, both by the same inventor. The disclosures of these related applications are incorporated herein by reference.

The database 224 in the computer storage system 220 can store a plurality of object names, the names of properties for each object, and association-strength values of the properties for each object. The object names, the property names, and the association-strength values can be stored in a table form, as shown in FIG. 1 as a dataset with a name in association with the object name for retrieval, or in other data structures. The above described database can be called a Knowledge Base because it stores knowledge about associations among objects and properties. As discussed previously, the association strength for a property is dependent on the object of interest, thus the association strength can also be referred to as Object-Dependent Association Strength (ODAS).

The accuracy of information assessment, as well as the performance of other applications that utilize such association knowledge, is critically dependent on the quality of data stored in the database 224. In the presently disclosed methods and system, novel methods are provided for the discovery or identification of the potential properties of an object through the information structure of natural language contents; and for the quantitative measurements of such "defining powers" for each of the properties of an object based on the linguistic-cognitive nature of such properties.

First, in the present disclosure, the potential property terms of an object are identified from training data that are selected using novel selection methods based on the linguistic-informational structure of such data. As has been described above in the OPAM model, the basic information structure of a simple sentence is "Object+Properties", corresponding to the grammatical structure of "Subject+Predicate" of the sentence. The basic information structure of a complex phrase can also be represented by the "Object+Properties" structure, corresponding to the grammatical structure of "Head+Modifiers" of the phrase. Thus, if the target object name is the subject of a sentence, there is a high likelihood that the sentence contains at least one property term of the object, likely in the predicate of the sentence. Or if the subject of the sentence is a complex phrase and the target object name is somewhere in the phrase, or such a phrase is elsewhere in the sentence, there is a high likelihood that the phrase as well as the entire sentence contains at least one property term of the object. In the present disclosure, training data selection methods are based on this unique principle. Conventional machine-learning methods related to feature selection for document classification try to extract features from training documents that are selected based on the belief or human judgment that such documents are related to the target class, or based on the fact that the training data contain a specific word or phrase that represents the target class. Such methods are intuitive and obvious, but the quality and accuracy cannot be assured as such training data may often contain more irrelevant contents than what is related or truly relevant to the class. Compared with such intuitive methods that do not make reference to the internal linguistics and informational structure of the training data, the novel methods in the present disclosure can greatly enhance the quality of machine-learning results, particularly for the object-property association knowledge data, and minimize the noise in the training data.

Furthermore, in the present disclosure, the importance of a property to an object, or the "defining power" of a property is determined by two aspects of the property:

1) the degree of closeness of the property to the object, and 2) the degree of closeness of the property to everything that is not the object.

The following four sentences can be used to illustrate the above principle.

3A. "A computer has a CPU."
3B. "A computer has a parallel port."
3C. "A computer has a case."
3D. "A computer has color."

"CUP", "parallel port", "case", "color" are all properties of the object of "computer", but it is apparent that they are of different degrees of importance or prominence or the defining power for the object of "computer". In the sentence 3A, the CPU is almost exclusively a component of the object "computer". "CPU" is a critical and indispensable part of every single computer, but it is almost never a component of something that is not considered a computing device. "CPU" thus has a high degree of closeness to the object of computer, but almost zero degree of closeness to what is not a computer.

In the sentence 3B, the "parallel port" is also almost exclusively a component of the object of computer, but it is not a critical and indispensable part of every single computer, and almost nothing else that is not considered a computing device may also have it as a component. The term "parallel port" has a lesser degree of closeness to the object of computer, but almost zero degree of closeness to what is not the object.

In the sentence 3C, although "a case" is a component of almost all computers, it is not a critical or indispensable component, nor exclusively a component of computers, but a common component of many objects that are not computers, such as a camera, a cell phone, etc. Presumably, it is of equal degree of closeness to computers and non-computers.

In the sentence 3D, although having color is a property of all computers, not only it is not a critical and exclusive property of computers, but also it is a property of almost everything else, and more a property of more importance of many other objects that are not computers, such as flowers, paintings, etc. It is of a low degree of closeness to the object of computer, but a high degree of closeness to many other objects that are not computers.

In view of the above analysis, the importance of a property to an object is determined by the property's degree of closeness to the object as well as its degree of closeness to all other objects. In the present disclosure, the two factors are quantified using novel linguistic-informational analysis techniques and computing methods that produce the numerical values to be stored in the database 224.

In the present disclosure, a property's closeness to the object is herein named as the "Internal Association Strength" (IAS). A property's closeness to everything that is not the object is herein named as the "External Association Strength" (EAS). Since the same-named property can have different association strength values to different objects, such as the property of "color" to the object of "computer" as compared with the object of "flower", the measurement of the association strength of a property is object-dependent. Thus, the overall importance of such a property is herein named the "Object-Dependent Association Strength" (ODAS), which represents the property's net association strength to a specific object.

Figure 3:
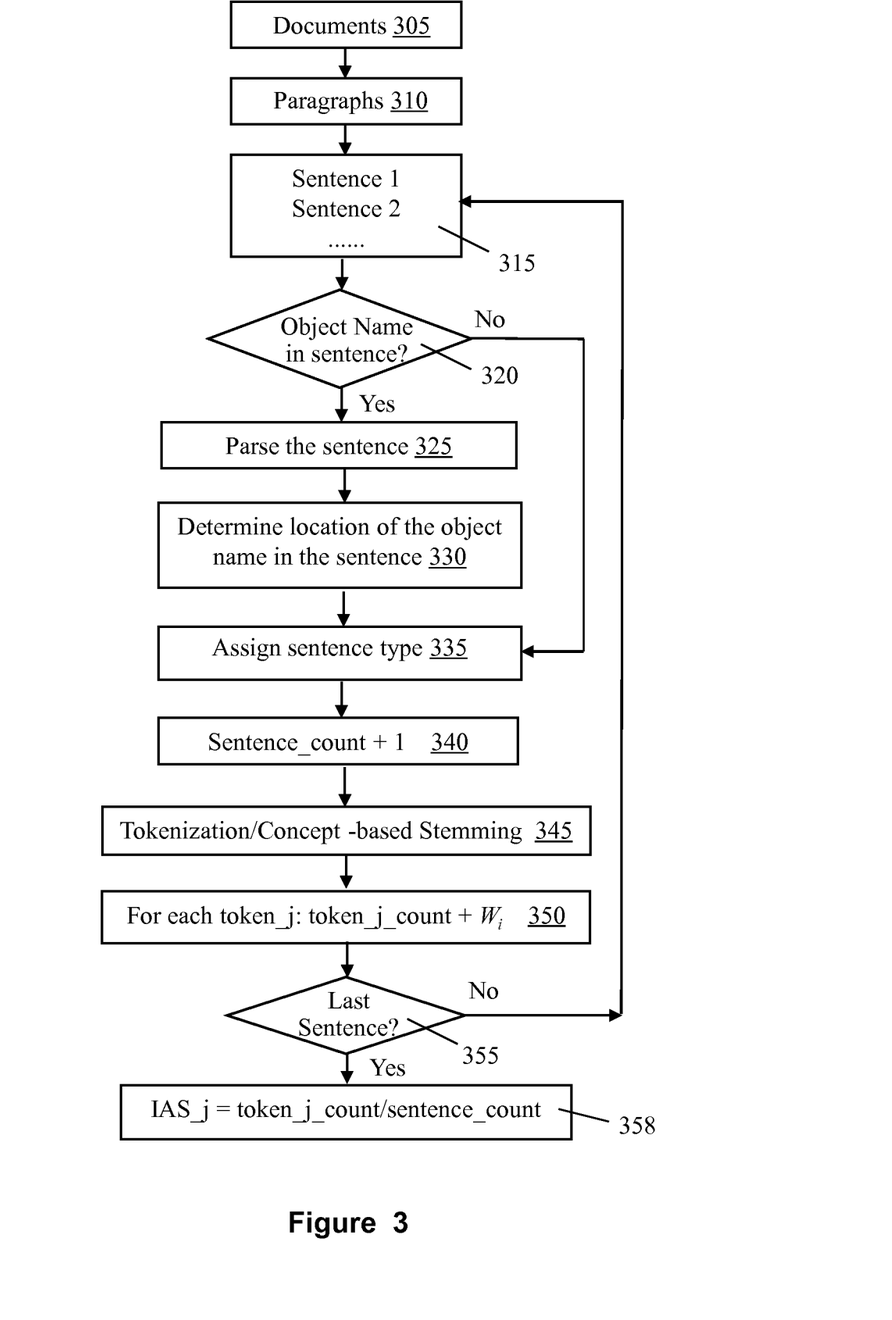
FIG. 3 is an exemplified flow diagram for obtaining the values of internal association strengths in accordance with the present invention.

FIG. 3 illustrates an exemplified process for computing internal association strengths of properties relative to an object. A first group of documents are used to compute internal association strengths (step 305). These documents can be obtained from any available written materials, such as newspapers, books, dictionaries, emails, and web pages, etc. The first group of documents are known to include the object name or to contain information about the object. In one example, the first group can include one thousand or more documents that each includes at least one occurrence of the object name. In general, the accuracy of computation can be improved by using as more text units and from as diverse sources as available and feasible. Each document is separated into one or more paragraphs (step 310). Each paragraph is separated into one or more sentences such as sentence 1, sentence 2, etc. Optionally, complex sentences are broken down into simple sentences (step 315).

A sentence in the one or more sentences is then selected and checked if the sentence includes the object name or not (step 320). If not, the sentence is assigned to a special Sentence Type in step 335 as discussed below. If yes, the sentence is parsed by a syntactic parser to identify components of the sentence such as the subject, the predicate, and detailed structures within the subject, the predicate, or other parts of the sentence (step 325). For a multi-word phrase, the parsing operation can identify the head and the modifier of the phrase.

The location of the object name in the sentence is next determined based on the parsing results (step 330), and a Sentence Type is assigned to the sentence according to the location of the object name in the sentence (step 335). An exemplified Sentence Type definition can include the following:

If the object name matches the subject, the sentence is marked as a Type 1 sentence. This type of sentences is most likely to include at least one property name with high defining power to the object.

If the subject is a multi-word phrase and the object name is the head of the multi-word phrase, the sentence is marked as a Type 2 sentence.

If the subject is a multi-word phrase and the object name is a modifier in the multi-word phrase, the sentence is marked as a Type 3 sentence.

If the object name matches the predicate of the sentence, the sentence is marked as a Type 4 sentence.

If the predicate contains a sub-phrase and the object name is the head of the sub-phrase, the sentence is marked as a Type 5 sentence.

If the predicate contains a multi-word phrase and the object name is a modifier in the multi-word phrase, the sentence is assigned as Type 6.

If the object name is in any other text in the sentence, the sentence is marked as a Type 7 sentence.

If the sentence does not contain the object name (step 320), as a follow up to a negative answer to the question in the step 320, the sentence bypasses the parsing process in step 325 and step 330, and is marked as a Type 8 sentence. Although this type of sentences do not contain the object name, words and phrases (as potential property names) in this type of sentences may still carry some relevance (albeit not as strong as the other sentence types) to the object name because the paragraph or document such sentences are extracted from has been determined to be related to the object name.

As discussed above in relation to OPAM, different types of sentences may have different degrees of likelihood of containing property names with different degrees of defining power as a result of object name being in different locations in the sentences.

A parameter "sentence_count" is next incremented by 1 (step 340). The parameter "sentence_count" tracks the total number of sentences that passes the step 320, each of which may include potential property terms associated with the object name.

Next, different words and/or phrases in the sentence are extracted as tokens or potential property names (step 345). In some cases, the use of a parser for the purpose of tokenization is optional. When a parser is not used for the tokenization of the sentence, other methods such as single-word tokens or multi-word n-gram methods can be used.

Depending on the specific language being processed, a process called stemming may be employed. This usually applies to Western languages, such as English and other members of the Indo-European language family, but not always applicable in many of the Eastern languages. When it applies, as an optional step, the presently disclosed methods provide a novel approach of concept-based stemming in the tokenization of the sentences in the training data. The concept-based stemming merges only those words that are morphological variations of the names of the same concept or object name, for example, the plural form of a noun with the singular form of the same noun in English. In English, certain morphological variations of verbs, such as those for tense and aspects (e.g. "go", "went", and "gone") have their own shades of meaning and thus are not recommended for stemming. Variations for subject-verb agreement, such as "go" vs. "goes", are recommended for merging since they are referring to the same concept of an action. One aspect of the presently disclosed methods is that different rules of morphological consolidation can be used for specific languages. This concept-based stemming method is different from common practices in the conventional document retrieval or classification.

In some aspects, the so-called "stop words" can be included in the presently disclosed methods. Some words that are treated as "stop words" in conventional techniques are considered here to be also meaning-carrying units in the language, which may be part of the names of potential properties of certain objects. For example, "the" and "a" in English are conventionally excluded from text analysis as non-meaning-carrying words. However, phrases such as "a house" and "the house" can be very different in meaning under different contexts. In a legal document about the ownership of a house, a sentence "He owns a house" can have a very different consequence from the sentence "He owns the house". Since the present system and methods involve the meanings of natural languages, such conventional "stop word" can be included for identifying property names.

Each term (i.e. a word or a phrase) extracted from the training data is called a token. For a jth token a parameter "token_j_count" is incremented by a weighting coefficient, $W_i$, which depends on the Sentence Type, i, for each sentence of type i that includes the jth token (step 350). The weighting coefficient, $W_i$, can have an exemplar value between 0 and 1, the magnitude of which reflects the different degrees of likelihood for potential property names in different sentence types. Using the example of Sentence Type definition described above, $W_1$ (for a Type 1 sentence) may be assigned a value of 1 because a term in a Type 1 sentence is more likely to be a high-valued property name than in other types of sentences. Thus, for each Type 1 sentence that includes the jth token, "token_j_count" is incremented by 1. Similarly, values of other weighting coefficients can be exemplarily set as $W_2=0.9$; $W_3=0.8$; $W_4=0.7$; $W_5=0.6$; $W_6=0.5$; $W_7=0.4$; $W_8=0.3$ for the corresponding types of sentences in accordance with the decreased likelihood that a token may be a high-valued property name in the corresponding sentence types. In general, the contributions to "token_j_count" by these types of sentences are their respective weighting coefficients, and it is mathematically equivalent to their respective counts of sentences that include the jth token being scaled by their respective weighting coefficients.

Steps 315 to 350 are to be repeated until all the sentences in the paragraphs and the documents that meet the selection criteria are finished (step 355). The internal association strength "$IAS_j$" for the jth token is the cumulative "token_j_count" divided by "sentence_count" that is the total number of the sentences selected as the training data (step 358). $IAS_j$ has a value between zero and one. The most relevant property names can be obtained by selecting tokens that have IAS values higher than a predetermined threshold.

It should be noted that Sentence Type definition can include different variations, and the weight coefficient W can be assigned different values.

In some embodiments, a single type of sentences, such as type 1, or a mix of a selected number of sentence types can be used as the training data. One exemplar case for such a choice is when a large number of high-quality sentence types are available, so only the high-quality sentence types, such as type 1 or type 2 sentences are used; or when a high precision of the association data is required, thus only the high-quality sentence types should be used. Similarly, the number of sentences selected as the training data can be a portion of the total sentences from the first group of documents in step 305, and the "sentence_count" can be adjusted accordingly.

As has been described earlier in relation to OPAM, one of the principles in the to present disclosure is that the importance of a property to an object, or the "defining power" of a property is determined by two aspects of the property:

1) the degree of closeness of the property to the object, which is the internal association strength as described above; and 2) the degree of closeness of the property to everything that is not the object, which is the external association strength described below.

Figure 4:
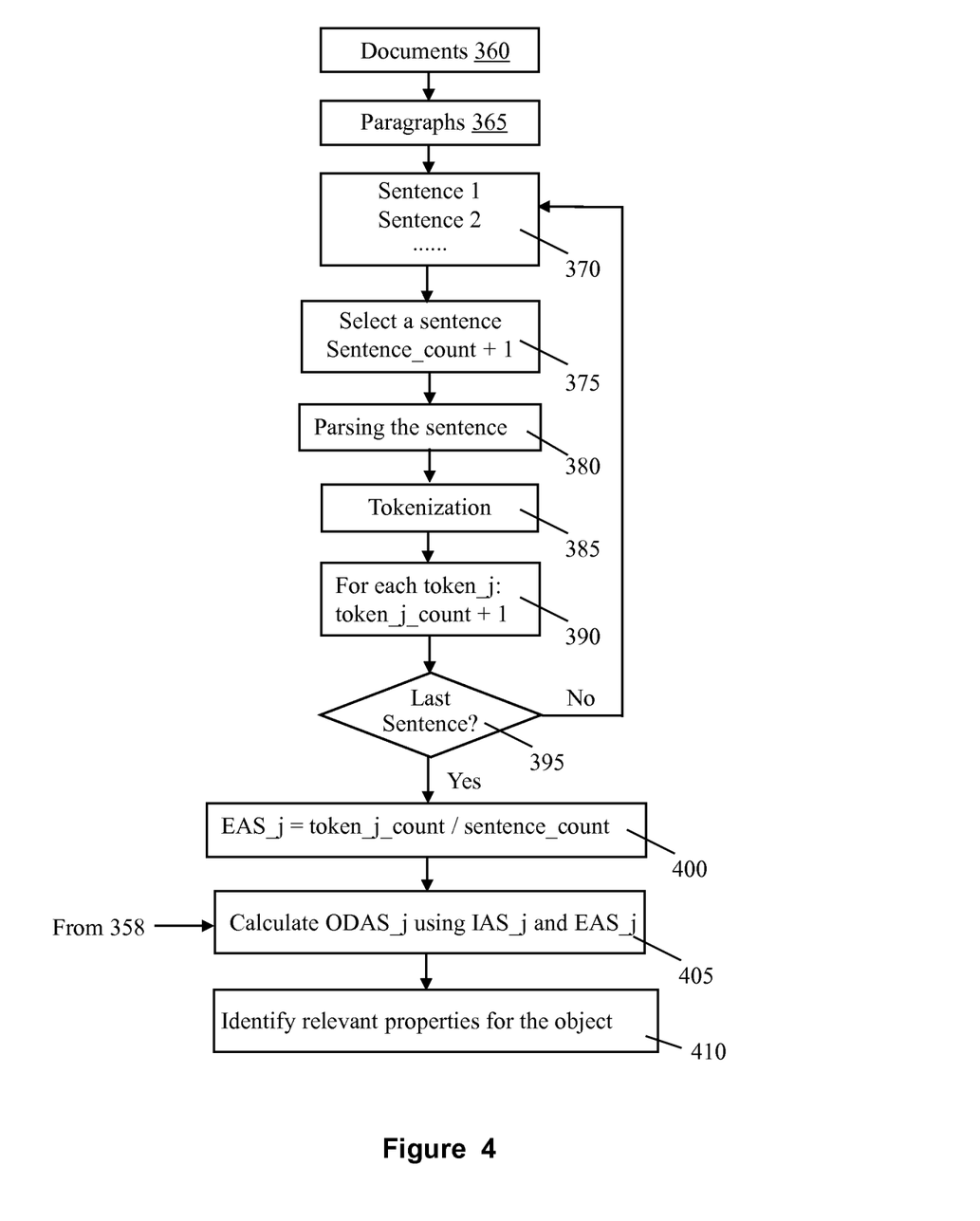
FIG. 4 is an exemplified flow diagram for obtaining the values of object-dependent, internal, and external association strengths in accordance with the present invention.

In some embodiments, referring to FIG. 4, a second group of documents are used as training data to obtain the external association strength of the potential property terms of an object. These documents do not contain the object name or are determined to be not about or not related to the object even they may contain the object name (step 360). The data amount (the numbers of documents, paragraphs, and sentences) in the second group is usually more than the data amount in the first group of documents because there is typically a lot more information not related to an object than the information related to an object. An important aspect of this method is to select training data from random sources. The documents are separated into paragraphs (step 365) and sentences (step 370).

The "sentence_count" is incremented by one for each sentence in the document group (step 375). The sentences each is then optionally parsed to identify its grammatical components such as the subject and predicate and other phrases (step 380). The use of a parser is preferred, but not required, for the purpose of identifying well-formed phrases for use in the tokenization process later. If a parser is used for the tokenization of the internal association training data (step 325), a parser should also be used for the tokenization of the external association training data to avoid inconsistency. When a parser is not used, other methods of tokenization, including the single-word tokens or n-gram method can be used. Optionally, concept-based stemming process as described above is used. Since the second group of documents do not include the object name, no sentence type and weighting coefficients are required.

If the sentence includes a jth token, "token_j_count" is incremented by one (step 390). Steps 370 to 390 are repeated until the last sentence in the second group of the documents (step 395). The external association strength for the jth token is calculated (step 400) by the cumulative token count for the jth token "token_j_count" in the second group of documents divided by the cumulative sentence_count "sentence_count" in the second group of documents. $EAS_j$ has a value between 0 and 1.

In some embodiments, the number of sentences selected as the training data can be a portion of the total sentences from the second group of documents in step 360, and the "sentence_count" can be adjusted accordingly.

Finally, the object-dependent association strength (ODAS) for the jth token as a property name is calculated (step 405) using the $IAS_j$ obtained in step 358 (FIG. 3) and the $EAS_j$ obtained at the step 400.

In some embodiments, $ODAS_j$ for a jth property is computed by the following equation:

$$ODAS_j = IAS_j - EAS_j \qquad \text{(Eqn. 1)}$$

Using this method, the ODAS value for a token or a property name can be in a range between −1 and 1. It should be noted that although an ODAS value can be −1 for a property, which means that the property is never associated with the object in the training data, but associated with the non-object-related data 100% of the time, in reality, however; when the training data for the external association is in a large enough quantity and truly from random sources, most of the negative ODAS values tend to be slightly below zero. Thus, in some embodiments, negative ODAS values can be assigned to zero so that ODAS always has a value range between 0 and 1.

In some other embodiments, the object-dependent association strength can be calculated using different formulae from the above, for example, using a formula:

$$ODAS_j = IAS_j * (IAS_j / (IAS_j + EAS)) \quad \text{(Eqn. 2)}$$

One beneficial feature of the formula in Eqn. (2) is that ODAS does not have negative values. This can be understood in the following example: for the object of "computer", the property of "has a color" may have a stronger external association than internal association, thus having a negative ODAS value based on Eqn. (1). From the cognitive point of view, however, a color is still a property of the object of "computer", even though it is not an important property. In such cases, a small positive ODAS value from Eqn. (2) can be cognitively more reasonable and convenient than a negative value.

It should be noted that the use of IAS, EAS, and ODAS in the present disclosure is different from feature selection for document classification in some conventional classification systems. The conventional classification systems are mainly based on pure mathematical approaches, such as Information Gain, Mutual Information, etc., rather than based on the linguistic and cognitive approach as described in the present disclosure. And the features selected by the conventional methods are for the classification only, rather than for the quantitative measurement of association strengths of properties related to an object as described in the present disclosure.

In some embodiments, the text unit for identifying property names and computing IAS, EAS, and ODAS can be paragraphs or documents instead of sentences. Paragraphs as text units can be viewed as a special case of treating documents as text units.

For example, when paragraphs are used as the text unit for IAS, the paragraphs can each contain at least one incidence of the object name. A paragraph can be assigned a paragraph type number, k, with a corresponding weighting coefficient value $W_k$, depending on what type of sentences as defined above (in step 335) the paragraph contains, such as whether the object name is in the subject or the predicate of the sentence, and/or how many of such sentences the paragraph contains, and/or how many occurrences of the object name the paragraph contains. A parameter "paragraph count" is incremented by 1 for each paragraph selected as training data. A parameter "token_j_count" is incremented by the value of the weighting coefficient $W_k$ when a paragraph contains at least one occurrence of the jth token. IAS is calculated by dividing the cumulative "token_j_count" by the cumulative "paragraph count". In calculating the EAS, paragraphs can be selected from the second group of documents that do not contain the object name. "token_j_count" is incremented by 1 for each paragraph that contains at least one occurrence of the jth token. The EAS for the jth token is calculated by the cumulative token count for the jth token "token_j_count" in the second group of documents divided by the cumulative paragraph count "paragraph count" in the second group of documents. The final ODAS value for the jth token is obtained from either Equation (1) or Equation (2). The same methods apply when the text units of training data are documents instead of paragraphs.

Figure 5:
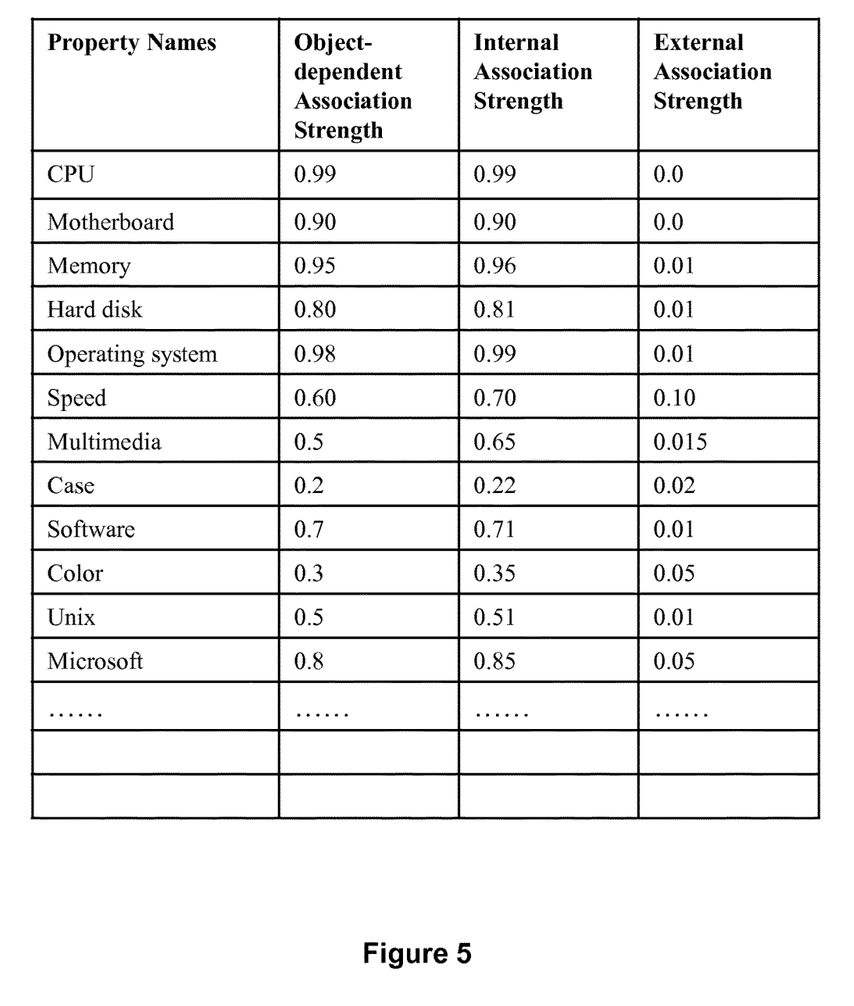
FIG. 5 illustrates a data structure with exemplified properties and their association strengths relative to the object "computer".

FIG. 5 illustrates an exemplified data structure for the association strengths for the object of "computer", which can be stored in the data base 224. Values for association strengths (ODAS, IAS, and EAS) are listed for each property such as "CPU", "Motherboard", "Memory" . . . etc. For the property name "CPU", IAS is exemplarily 0.99, and EAS is exemplarily 0.0, which means CPU occurs in most of the sentences or documents about the object "computer", but almost never occurs in context that does not include the object name of "computer". ODAS is thus 0.99 (0.99−0.0). For the property name "speed", although it occurs frequently in sentences or documents about "computer" with an IAS of 0.7, it is also frequently used in other context, giving an EAS of 0.1. The property name "speed" thus has an ODAS of 0.6 (0.70−0.1).

The presently disclosed methods and system can produce data packages for object names and their associated data structures for association strength values of a very large number of properties. A list of property names is stored for each object name. In some embodiments only a subset of such properties are needed, such as those that are considered to be more relevant or the more defining properties of the object than others. Relevant property names can be selected if their ODAS values are above a threshold value (step 410, FIG. 3). For example, a threshold value for ODAS can be 0.001. Property names that have ODAS values below the threshold can be viewed as irrelevant to the object and can be discarded. Each data package for a property name stores three association values of ODAS, IAS, and EAS as exemplified in FIG. 5.

Figure 6:
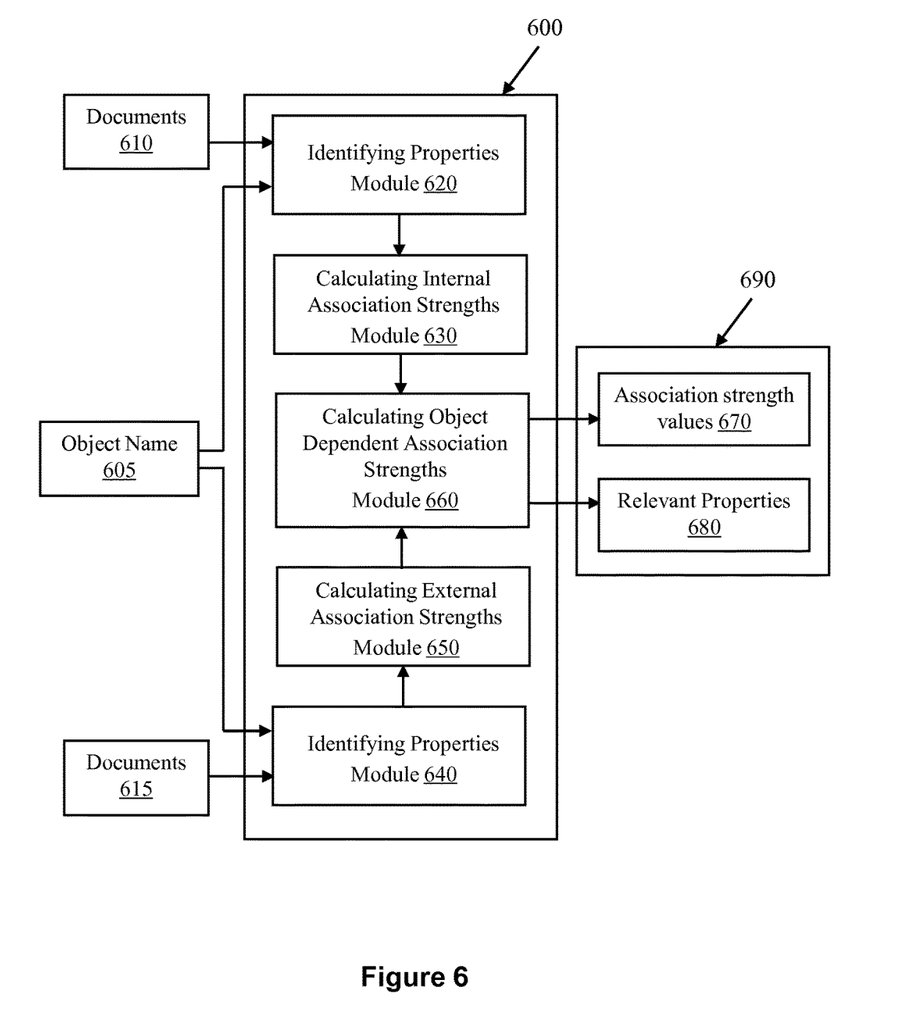
FIG. 6 is an exemplified system diagram for identifying property names for an object and for computing association strengths for the properties related to the object in accordance with the present invention.

FIG. 6 illustrates a computer system 600 for identifying properties for an object and for computing association strengths for the properties related to the object. The computer system 600 is suitable for conducting the processes illustrated in FIG. 3 and FIG. 4. The computer system 600 includes a module 620 configured to receive an object name 605 and a first group of documents 610 that contain information about the object. In some embodiments, the module 620 can also identify and select documents in the first group of documents 610 that contain information about the object among a large number of documents. The module 620 is configured to identify potential property names related to the object in the first group of documents (as shown, for example, in steps 320-350 in FIG. 3). A module 630 is configured to calculate values of internal association strengths for the potential properties. The computer system 600 also includes a module 640 configured to receive the object name 605 and a second group of documents 615 that are not about the object. The module 640 is configured to identify potential property names in the second group of documents (as shown, for example, in steps 375-395 in FIG. 3). A module 650 is configured to calculate values of external association strengths for the potential properties identified by the module 640. A module 660 is configured to compute object-dependent association strength using the values of internal association strengths from module 630 and the values of external association strengths obtained by the module 650. The computer system 600 can output association strength values 670 for IAS, EAS, and ODAS to be stored in a knowledge module 690. The computer system 600 can also select a list of relevant properties 680 by filtering IAS and EAS with predetermined range criteria (thresholds, upper bounds, etc.) (as described in step 410), and output the list of relevant properties 680 to be stored in the knowledge module 690. The knowledge module 690 can be stored as the database 224 (FIG. 2).

The above described data package can be used as a stand-alone portable knowledge module that can be flexibly utilized in various systems or applications. In document classification, for example, such data packages can be used as pre-trained feature vectors for specific classes in various classifier instances or document repositories. Such data packages can also be used as portable pre-trained knowledge modules in various intelligent systems for content or topic recognition and object detection, document relevance ranking, ambiguity resolution for word senses, and other natural language processing applications.

Another novel aspect of the above described data packages is that it provides additional knowledge data of both the internal and external association strength values. Such a novel and unique data structure and content can allow intelligent systems to more accurately adjust system sensitivity for feature detection to meet specific requirements of the tasks, and enhance the performance by making selective use of the data content.

For example, "recall" and "precision" are two common performance measures in information retrieval and document classification. In certain situations, a higher recall rate may be more desired than precision, such as when there are only a small number of documents that are potentially relevant to the query, or when there is a need to examine all potentially related documents in the repository no matter how many such documents are there in the repository. With the novel data contents and structure of the present invention, when they are used for document retrieval, recall can be emphasized by selecting a subset of the properties of which the internal association strength values are above a medium or low threshold, and the external association strength are below a medium-valued upper bound. For example, a threshold value of 0.01 for the internal association strength, and an upper bound value of 0.01 for the external association strength. The customized value ranges for the IAS and EAS can help retrieve, classify, or rank more potentially relevant documents.

In some other situations, a higher precision is more desired than recall. For example, when there are a huge number of potentially relevant documents in the repository, it is often unnecessary and uneconomical to examine an overwhelmingly large number of documents. With the presently disclosed novel data contents and structure, when used for document retrieval, precision can be emphasized more than recall by selecting a subset of the properties of which the internal association strength values are above a medium or high threshold, and the external association strength values are below a low-valued upper bound: for example, a threshold value of 0.35 for the internal association strength, and an upper bound of 0.005 for the external association strength. The customized value ranges for the IAS and EAS can help more precisely retrieve, classify, or rank documents.

Figure 7:
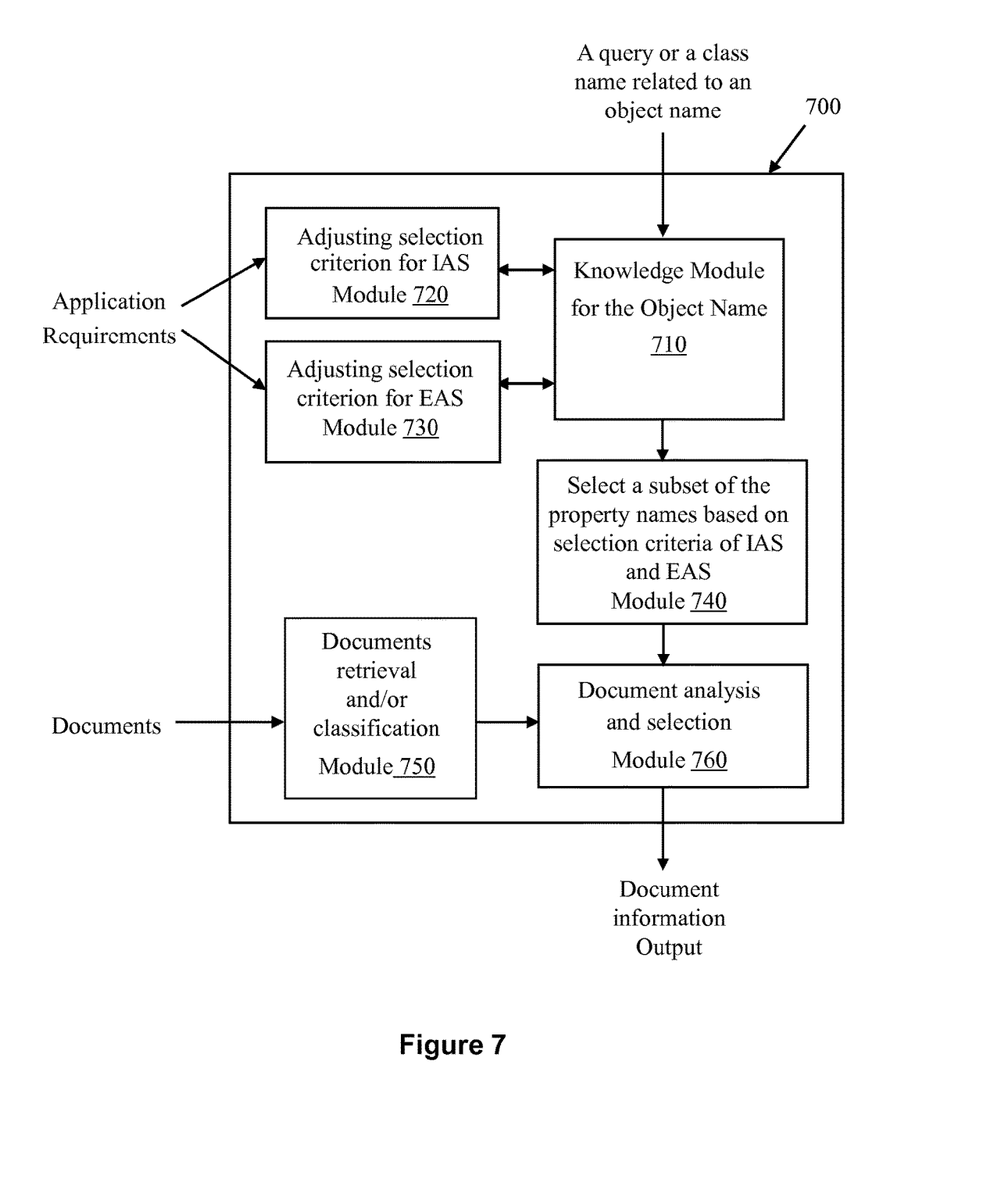
FIG. 7 is an exemplified system diagram for an intelligent information retrieval and document classification system capable of adjusting the system sensitivity for different applications using the disclosed data packages.

FIG. 7 shows an intelligent information retrieval or document classification system 700 that is capable of flexibly adjusting system sensitivity for different applications using the disclosed data packages. The system 700 receives an object name (as a query or a class name) and documents to be analyzed. The system 700 retrieves a knowledge module 710 related to the object name. The knowledge module 710 includes data packages that include IAS, EAS, and ODAS values for a plurality of property names related to the object name, as described above. The system 700 also receives application requirements for retrieving the information or classifying the documents. For example, some applications may require, as described above, that a higher recall rate is more desired than precision. Some applications may require that a higher precision is more desired than recall. A module 720 can adjust the IAS threshold value to select a subset of the property names in accordance with the application requirements. Another module 730 can adjust the range for the EAS value to select another subset of the property names in accordance with the application requirements. For example, as described above, the IAS threshold can be set at or below 0.01; and the EAS value can be set at or above 0.01 if a higher recall rate is more desired than the precision. A module 740 can select a subset of property names in the knowledge module for the object name that are above the IAS threshold but below the EAS upper bound. The documents are retrieved into the system 700 by a module 750. A module 760 is configured to analyze the documents retrieved by the module 750 using the selected property names by the module 740. The documents are then selected, classified, or ranked etc. by module 760. The result is output by system 700.

Also as illustrated in FIG. 2, the result can be stored in output data 225 or to other external sources, or displayed in a user interface on a computer screen 230. The output can include information related to the components in module 215 as well as in 710-760, such as the ranking information, the category information, and information related to the object, which can be the object name or certain property terms and association strength values selected from the object-specific dataset as related or additional information about the object or its properties. When the dataset obtained from 224 is large, the property terms can be selected based on the association strength values as a degree of relatedness or the importance of the properties to the object, or based on conditions in the user interface 230 or storage 225 when output.

It should be understood that the above-described methods are not limited to the specific examples used above. Configurations and processes can vary without deviating from the spirit of the invention. For example, a value range for the object dependent association strength (or internal and external association strengths) can be selected other than the exemplified values described above. In calculating the IAS and EAS, the counting method can be based on numbers other than the single occurrence in a sentence, a paragraph, or a document. The total frequency of the token in a sentence, a paragraph, or a document can be Jo used instead of the single occurrence counting, or can be used in combination with the single occurrence counting method. Different sentence types and associated weighting coefficient values as well as the methods for determining the types and coefficient values can be used to reflect the quality and/or confidence of property terms and their association strengths identified from different types of sentences, paragraphs, and/or documents that contain the object name in different quantity and/or positions in the sentences, paragraphs, and/or documents. The range values for adjusting the system sensitivity, such as those for the preference of recall over precision or vice versa, can be customized for specific applications.

Moreover, the association strength can be expressed in the form of a continuous scale of numerical values or in the form of discrete ranges. The values of association strengths and/or the values of weighting coefficients can be in a range between 0 and 1, and/or in other ranges.

What is claimed is:

1. A computer system for producing a dataset for representing a term or an object, the system comprising:
   one or more processors operable to
   receive a first group of text contents comprising a plurality of text units;
   receive, or identify from the text contents, a first term comprising a word or a phrase;
   identify a text unit comprising a sentence or a phrase containing the first term and one or more second terms each comprising a word or a phrase;

identify a relation between the first term and one or more second terms in the text unit using a machine-based algorithm based on occurrence, or location, or attributes associated with the first term or the one or more second terms;

determine one or more numerical values to represent the relation or the strength of the relation between the first term and the corresponding one or more second terms;

collect one or more of the one or more numerical values into a group of numerical values;

associate the group of numerical values to the first term to form a dataset;

output the dataset as a representation of the first term or an object represented by the first term based on relations between the first term and terms other than the first term.

2. The system of claim 1, wherein the one or more processors are further operable to collect, based on the relation or based on the numerical values, one or more of the one or more second terms into a group of second terms;

associate the group of second terms to the first term to form the dataset.

3. The system of claim 2, wherein the dataset is further used for providing a representation of the first term by other terms, or providing a representation of an object represented by the first term, wherein the object comprises a physical object or a conceptual object, wherein the group of second terms represent properties associated with the object.

4. The system of claim 2, wherein at least one of the one or more second terms in the dataset is associated with one of the numerical values.

5. The system of claim 4, wherein the at least one of the one or more second terms is collected based on the one of the numerical values.

6. The system of claim 4, wherein the function of the one of the numerical values includes representing the strength of association between the at least one of the one or more second terms and the first term, or between a property or attribute represented by the at least one of the one or more second terms and the object represented by the first term.

7. The system of claim 1, wherein the one or more numerical values are determined based on the number of text units that contain the first term or the one or more second terms, or the number of occurrences of the first term or the one or more second terms in the text units.

8. The system of claim 7, wherein the one or more numerical values are determined further by dividing the one or more numerical values by the total number of text units in the first group.

9. The system of claim 1, wherein the one or more numerical values are determined based on the location of the first term or the one or more second terms in the text units.

10. The system of claim 1, wherein the one or more numerical values are determined based on whether the text unit is a phrase, a sentence, a paragraph, or a document containing a plurality of sentences or paragraphs.

11. The system of claim 1, wherein the one or more numerical values are determined based on a grammatical attribute associated with the first term, wherein the grammatical attribute includes at least a subject or a predicate of a sentence, or a head or a modifier of a multi-word phrase, or a sub-component of a multi-word phrase.

12. A computer system for producing a dataset for representing a term or information related to an object, the system comprising:

one or more processors operable to receive a first group of text contents comprising a plurality of text units;

receive, or identify from the text contents, a first term comprising a word or a phrase;

identify a text unit comprising a sentence or a phrase containing the first term and one or more second terms each comprising a word or a phrase;

identify a relation between the first term and one or more second terms in the text unit using a machine-based algorithm based on occurrence, or location, or attributes associated with the first term or the one or more second terms;

determine a strength measure of the relation between the first term and the corresponding one or more second terms;

collect, based on the relation and the strength measure, one or more of the one or more second terms into a group of second terms;

associate the group of second terms to the first term to form a dataset; and output the dataset as a representation of the first term by other terms associated with the first term, or information associated with an object represented by the first term, wherein the object comprises a physical or conceptual entity, wherein the group of second terms represent properties associated with the object.

13. The system of claim 12, wherein the one or more processors are further operable to produce a first score to represent the strength measure based on the occurrence, location, or attributes associated with the first term or the one or more second terms, wherein the group of second terms are collected based on the first score.

14. The system of claim 13, wherein the first score is produced based on the number of text units that contain the first term or the one or more second terms, or the number of occurrences of the first term or the one or more second terms in the text units.

15. The system of claim 14, wherein the first score is produced further by dividing the first score by the total number of text units in the first group.

16. The system of claim 13, wherein the first score is produced based on the location of the first term or the one or more second terms in the text units.

17. The system of claim 13, wherein the first score is produced based on whether the text unit is a phrase, a sentence, a paragraph, or a document containing a plurality of sentences or paragraphs.

18. The system of claim 13, wherein the first score is produced based on a grammatical attribute associated with the first term, wherein the grammatical attribute includes at least a subject or a predicate of a sentence, or a head or a modifier of a multi-word phrase, or a sub-component of a multi-word phrase.

19. The system of claim 13, wherein the function of the first score includes representing the strength of association between the at least one second term and the first term, or between a property or attribute represented by the at least one second term and the object represented by the first term.

20. The system of claim 13, wherein the first score is produced based on the occurrence or attributes associated with the one or more second terms in text units that do not contain the first term, or based on the number of text units that contain the one or more second terms but do not contain the first term.

* * * * *